(No Model.) 3 Sheets—Sheet 1.
C. G. P. DE LAVAL.
ROTATING SHAFT.
No. 431,750. Patented July 8, 1890.
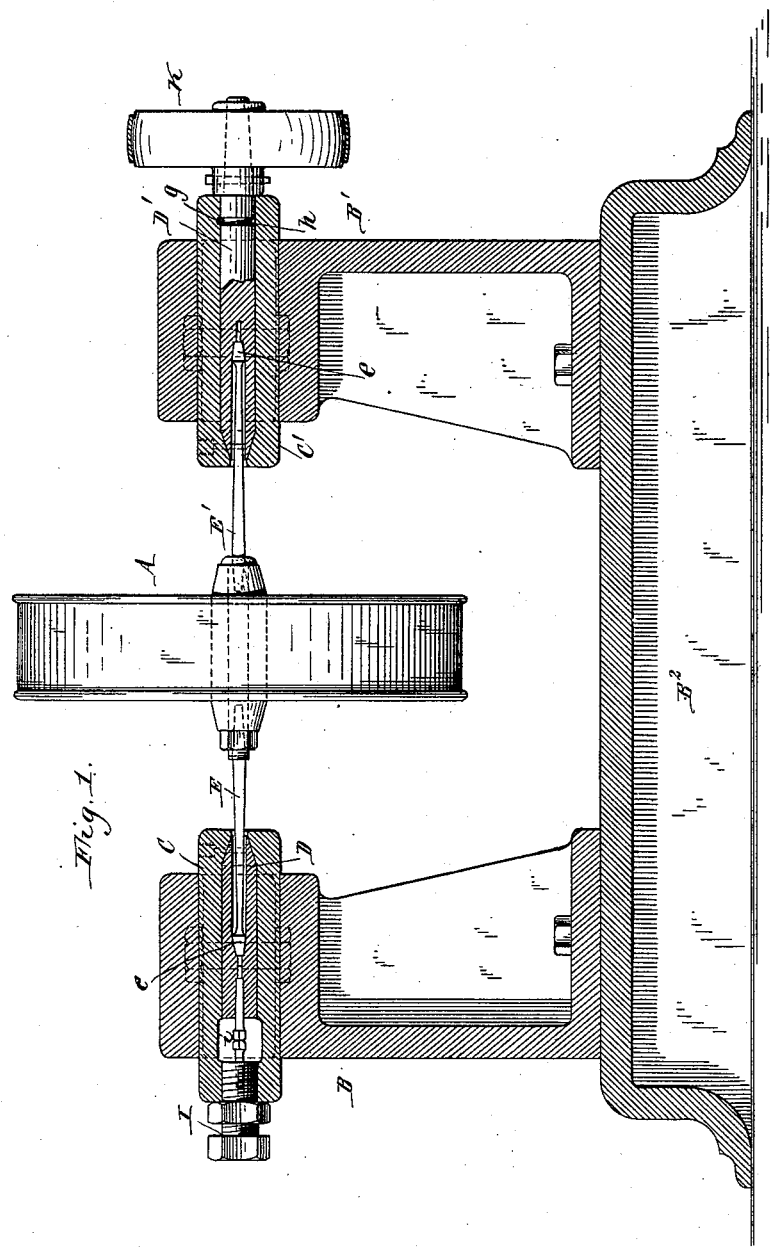
Witnesses:
Jacob Nusenblatt
Theo. L. Popp.
Carl Gustaf Patrik de Laval,
Inventor.
By Edward Wilhelm
Attorney.

(No Model.)　　　　　　　　　　　　　　　　　　3 Sheets—Sheet 2.
C. G. P. DE LAVAL.
ROTATING SHAFT.
No. 431,750.　　　　　　　　　　Patented July 8, 1890.
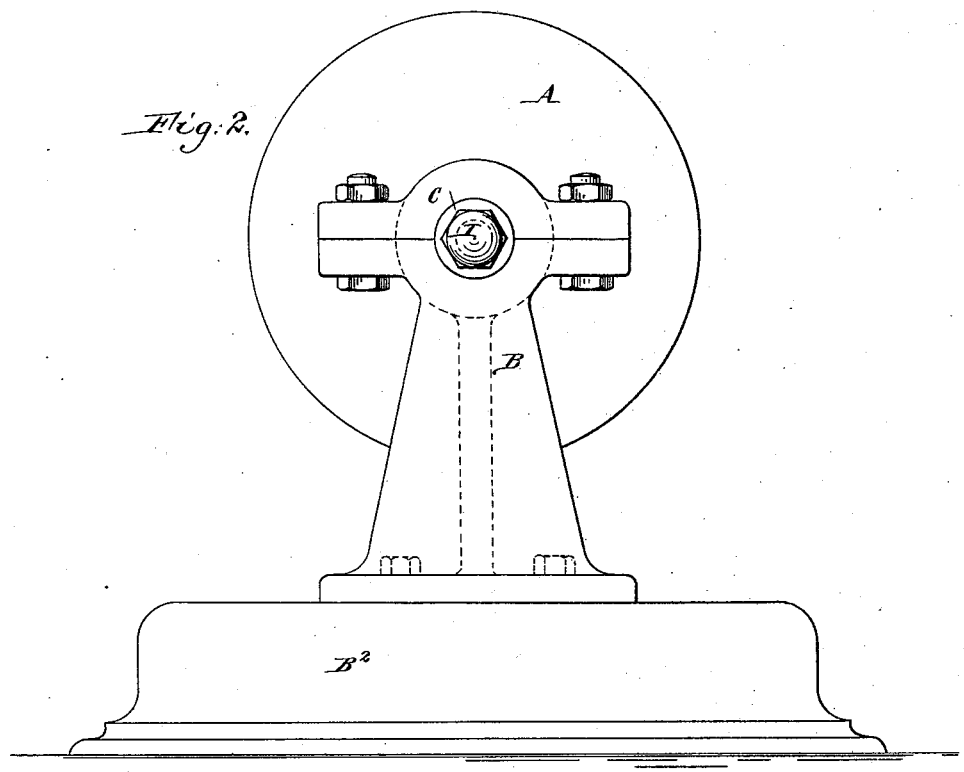
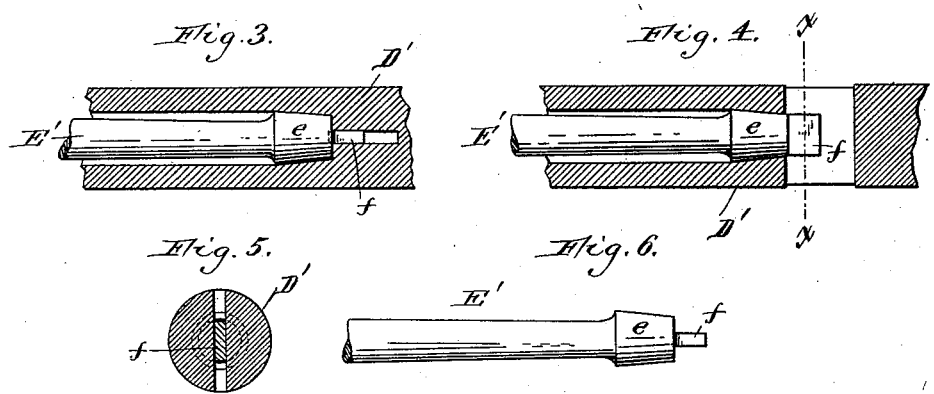

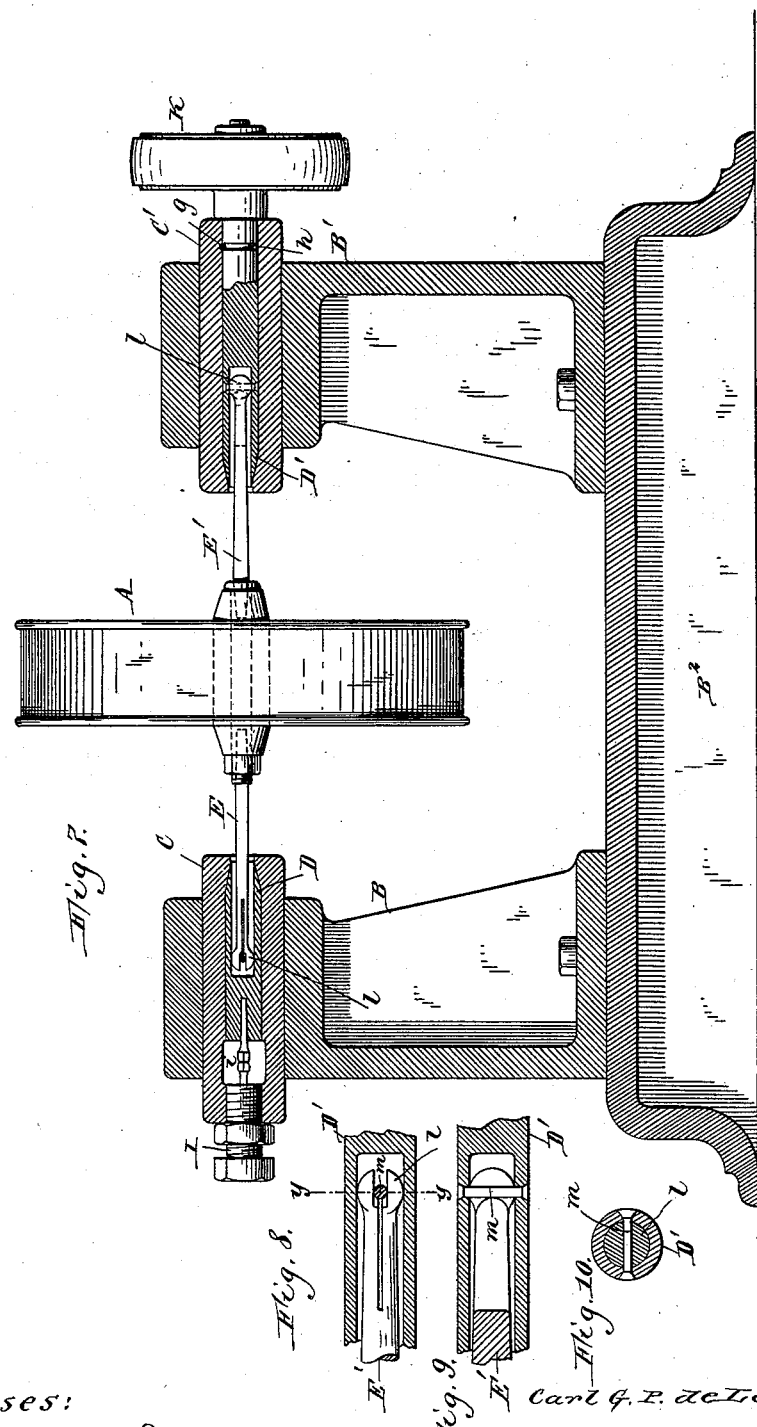

UNITED STATES PATENT OFFICE.

CARL GUSTAF PATRIK DE LAVAL, OF STOCKHOLM, SWEDEN.

ROTATING SHAFT.

SPECIFICATION forming part of Letters Patent No. 431,750, dated July 8, 1890.

Application filed April 22, 1890. Serial No. 348,998. (No model.)

*To all whom it may concern:*

Be it known that I, CARL GUSTAF PATRIK DE LAVAL, a subject of the King of Sweden, and a resident of the city of Stockholm, Sweden, have invented a new and useful Improvement in Rotating Shafts, of which the following is a specification.

This invention relates to that class of machine-shafts which rotate with very high velocities and support bodies of considerable weight—for instance, the shafts of dynamo-machines, cutting-machines, steam-turbines, &c. In machines of this kind the finest possible adjustment and balancing of the rotating parts and abundant lubrication do not prevent uneven and excessive wear and frequent heating of the surfaces which are in frictional contact.

The object of my invention is to render this fine adjustment and balancing unnecessary and to render the machine self-adjusting and self-balancing, so that the machine can be operated at a very high rotative speed with safety and without excessive wear and undue expenditure of power.

In the accompanying drawings, consisting of three sheets, Figure 1 is a sectional elevation of my improved shaft supporting a steam-turbine or other rotating body. Fig. 2 is an end elevation thereof. Fig. 3 is a fragmentary longitudinal section of one of the shaft-journals on an enlarged scale. Fig. 4 is a similar view at right angles to Fig. 3. Fig. 5 is a cross-section in line $x$ $x$, Fig. 4. Fig. 6 is a fragmentary elevation of the shaft. Fig. 7 is a sectional elevation showing a modified construction of my improved shaft supporting a steam-turbine or other rotating body. Fig. 8 is a sectional elevation showing the modified construction of one of the shaft-journals on an enlarged scale. Fig. 9 is a fragmentary section of one of the shaft-journals at right angles to Fig. 8. Fig. 10 is a cross-section in line $y$ $y$, Fig. 8.

Like letters of reference refer to like parts in the several figures.

A represents a rapidly-rotating body—such, for instance, as a steam-turbine, dynamo-machine, cutter, or any other machine or appliance which rotates at a high speed.

B B' represent standards arranged on opposite sides of the rotating body and supported on a base $B^2$.

C C' represent the fixed bearings arranged, respectively, in the heads of the standards B B'.

D D' represent journals revolving in the fixed bearings C C' and provided with cavities, which open inwardly or toward the rotating body.

E E' represent shaft-sections, which connect the rotating body with the journals D D', so that the body A, the shaft-sections, and the journals rotate together in the fixed bearings. The shaft-sections are constructed of steel or other flexible or elastic material, and are made so light that they will bend, spring, or yield when the rotating body runs out of true and adapt themselves to the position which the rotating body finally assumes and in which it runs steady. These shaft-sections are rigidly secured with their inner ends to the hub of the rotating body and taper toward their outer ends, which are provided with conical heads $e$. Each of these heads is provided at its outer side with a flat tenon $f$, which enters a slot in the journal, and whereby the shaft-sections and journals are compelled to rotate together. The outer portion of the cavity of each journal is provided with a tapering seat, in which the conical head $e$ fits. These heads and their tenons are capable of moving lengthwise in the journals as the shaft-sections bend in accommodating themselves to the position of the rotating body. The cavities in the journals are so large as to permit of the requisite lateral play of the shaft-sections. The inner end of each journal is preferably tapered and fitted in a tapering seat in the inner end of the bearing in which it revolves. The journal D' is held against lengthwise movement in its bearing by a transverse pin $g$, secured in the bearing and engaging in a groove $h$ in the journal, or by any other suitable device. The journal D is held against lengthwise movement by a pin $i$, which is held against the outer end of the journal by a hollow screw I, arranged in the outer end of the bearing.

K represents a pulley, gear-wheel, or other transmission device mounted upon the journal D'. When the rotating body is a motor, this device is used for transmitting power from the journal, and when the rotating body is a machine, which requires power for its operation, the transmission device is used for transmitting power to the journal.

In the modified construction of my improved shaft (represented in Figs. 7, 8, 9, and 10) the outer portion of each shaft-section is provided with a spherical head $l$, which fits into the cavity of the journal, and which is split or bifurcated, so as to straddle a transverse pin $m$, secured in the journal.

My improved flexible shaft permits the rotating body to adjust itself toward and from the axial line of its bearings while in rotation until it assumes the position in which it runs steady. This is of great importance in machines in which the rotating part makes many thousand revolutions per minute, because it does away with the necessity of nicely balancing the rotating parts, which is in any case a difficult and expensive operation and prevents the transmission of vibrations to the bearings, so that the rotating body can be operated at a high speed with safety and without requiring an undue expenditure of power or causing uneven or excessive wear.

I do not wish to claim in this application the specific construction of the shaft, which is claimed in another application filed by me of even date herewith, Serial No. 348,997, filed April 22, 1890.

I claim as my invention—

1. The combination, with a rotating body and its fixed bearings, of a flexible or yielding shaft, by which said body is supported in the fixed bearings and enabled to adjust its position toward and from the axial line of said bearings while in rotation by bending or springing of the shaft, substantially as set forth.

2. The combination, with a rotating body and its fixed bearings, of a flexible or yielding shaft, upon which said body is mounted, and detached journals arranged in said bearings and connected with the ends of the flexible or yielding shaft, substantially as set forth.

3. The combination, with a rotating body and its fixed bearings, of a flexible or yielding shaft, upon which said body is mounted, and detached journals arranged in said bearings and provided in their inner portions with cavities, in which the outer portions of the flexible shaft play, substantially as set forth.

4. The combination, with a rotating body and its fixed bearings, of a flexible or yielding shaft, upon which said body is mounted, detached journals arranged in said bearings and receiving the outer ends of the flexible or yielding shaft, and a transmission device secured to one of said journals, substantially as set forth.

5. The combination, with a rotating body and its fixed bearings, of a flexible or yielding shaft having its outer ends provided with flat tenons, and hollow journals arranged in said bearings and having their cavities provided with slots for the reception of said tenons, substantially as set forth.

In testimony that I claim the foregoing as my invention I have signed my name, in presence of two witnesses, this 14th day of October, 1889.

CARL GUSTAF PATRIK DE LAVAL.

Witnesses:
  NERE A. ELFWING,
  A. W. ALMQVIST.